US012587557B2

(12) United States Patent
Huang

(10) Patent No.: US 12,587,557 B2
(45) Date of Patent: Mar. 24, 2026

(54) DETECTION METHOD OF NETWORK ANOMALY AND ANOMALY DETECTION APPARATUS

(71) Applicant: Wistron Corporation, New Taipei City (TW)

(72) Inventor: Yuan Fu Huang, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 181 days.

(21) Appl. No.: 18/511,860

(22) Filed: Nov. 16, 2023

(65) Prior Publication Data

US 2025/0097243 A1     Mar. 20, 2025

(30) Foreign Application Priority Data

Sep. 18, 2023     (TW) .................................. 112135433

(51) Int. Cl.
*H04L 9/40* (2022.01)

(52) U.S. Cl.
CPC ...... *H04L 63/1425* (2013.01); *H04L 63/1433* (2013.01); *H04L 63/20* (2013.01)

(58) Field of Classification Search
CPC .. H04L 63/1425; H04L 63/1433; H04L 63/20
See application file for complete search history.

(56) References Cited

U.S. PATENT DOCUMENTS

| | | | | |
|---|---|---|---|---|
| 10,158,658 | B1 | 12/2018 | Sharifi Mehr | |
| 10,623,429 | B1 * | 4/2020 | Vines ...................... | H04L 41/40 |
| 10,673,880 | B1 * | 6/2020 | Pratt ................... | H04L 63/1425 |
| 11,470,096 | B2 * | 10/2022 | Muddu ................. | G06F 16/444 |
| 2011/0214187 | A1 * | 9/2011 | Wittenstein ........... | H04L 61/301 |
| | | | | 726/25 |
| 2012/0079101 | A1 * | 3/2012 | Muppala ............. | H04L 63/1425 |
| | | | | 709/224 |
| 2014/0041032 | A1 * | 2/2014 | Scheper ................. | H04L 63/14 |
| | | | | 726/23 |
| 2014/0082730 | A1 * | 3/2014 | Vashist ............... | H04L 63/1416 |
| | | | | 726/23 |
| 2014/0101763 | A1 * | 4/2014 | Harlacher .......... | H04L 63/1458 |
| | | | | 711/163 |

(Continued)

FOREIGN PATENT DOCUMENTS

| | | |
|---|---|---|
| CN | 108737406 | 8/2020 |
| CN | 111783883 | 10/2020 |
| TW | 201818289 | 5/2018 |

OTHER PUBLICATIONS

Mark Steel. "Bayesian Time Series Analysis" (pp. 1-12) https://warwick.ac.uk/fac/sci/statistics/staff/academic-research/steel/steel_homepage/bayesiantsrev.pdf (Year: 2008).*

*Primary Examiner* — Joseph P Hirl
*Assistant Examiner* — Thomas A Gyorfi
(74) *Attorney, Agent, or Firm* — JCIPRNET

(57) ABSTRACT

A detection method of network anomaly and an anomaly detection apparatus are disclosed. In the detection method, one or more request intervals within a detection period are determined, where each of the request intervals is a time interval of two network requests from a network source. A network request anomaly from the network source is determined according to the request interval within the detection period.

18 Claims, 6 Drawing Sheets determine request intervals within a detection period ~S410 determine a network request anomaly from a network source according to the request intervals within the detection period ~S420

(56) References Cited

U.S. PATENT DOCUMENTS

2014/0325649 A1* 10/2014 Zhang ................... H04L 43/026
                                                    726/23
2015/0229662 A1*  8/2015 Hitt .................... H04L 63/1425
                                                    726/23
2022/0035721 A1*  2/2022 Iyengar .............. G06F 11/0757

* cited by examiner

| df | $\chi^2_{.995}$ | $\chi^2_{.999}$ | $\chi^2_{.975}$ | $\chi^2_{.950}$ | $\chi^2_{.900}$ | $\chi^2_{.100}$ | $\chi^2_{.050}$ | $\chi^2_{.025}$ | $\chi^2_{.010}$ | $\chi^2_{.005}$ |
|---|---|---|---|---|---|---|---|---|---|---|
| 1 | 0.000 | 0.000 | 0.001 | 0.004 | 0.016 | 2.706 | 3.841 | 5.024 | 6.635 | 7.879 |
| 2 | 0.010 | 0.020 | 0.051 | 0.103 | 0.211 | 4.605 | 5.991 | 7.378 | 9.210 | 10.597 |
| 3 | 0.072 | 0.115 | 0.216 | 0.352 | 0.584 | 6.251 | 7.815 | 9.348 | 11.345 | 12.838 |
| 4 | 0.207 | 0.297 | 0.484 | 0.711 | 1.064 | 7.779 | 9.488 | 11.143 | 13.277 | 14.860 |
| 5 | 0.412 | 0.554 | 0.831 | 1.145 | 1.610 | 9.236 | 11.070 | 12.833 | 15.086 | 16.750 |
| 6 | 0.676 | 0.872 | 1.237 | 1.635 | 2.204 | 10.645 | 12.592 | 14.449 | 16.812 | 18.548 |
| 7 | 0.989 | 1.239 | 1.690 | 2.167 | 2.833 | 12.017 | 14.067 | 16.013 | 18.475 | 20.278 |
| 8 | 1.344 | 1.646 | 2.180 | 2.733 | 3.490 | 13.362 | 15.507 | 17.535 | 20.090 | 21.955 |
| 9 | 1.735 | 2.088 | 2.700 | 3.325 | 4.168 | 14.684 | 16.919 | 19.023 | 21.666 | 23.589 |
| 10 | 2.156 | 2.558 | 3.247 | 3.940 | 4.865 | 15.987 | 18.307 | 20.483 | 23.209 | 25.188 |
| 11 | 2.603 | 3.053 | 3.816 | 4.575 | 5.578 | 17.275 | 19.675 | 21.920 | 24.725 | 26.757 |
| 12 | 3.074 | 3.571 | 4.404 | 5.226 | 6.304 | 18.549 | 21.026 | 23.337 | 26.217 | 28.300 |
| 13 | 3.565 | 4.107 | 5.009 | 5.892 | 7.042 | 19.812 | 22.362 | 24.736 | 27.688 | 29.819 |
| 14 | 4.075 | 4.660 | 5.629 | 6.571 | 7.790 | 21.064 | 23.685 | 26.119 | 29.141 | 31.319 |
| 15 | 4.601 | 5.229 | 6.262 | 7.261 | 8.547 | 22.307 | 24.996 | 27.488 | 30.578 | 32.801 |
| 16 | 5.142 | 5.812 | 6.908 | 7.962 | 9.312 | 23.542 | 26.296 | 28.845 | 32.000 | 34.267 |
| 17 | 5.697 | 6.408 | 7.564 | 8.672 | 10.085 | 24.769 | 27.587 | 30.191 | 33.409 | 35.718 |
| 18 | 6.265 | 7.015 | 8.231 | 9.390 | 10.865 | 25.989 | 28.869 | 31.526 | 34.805 | 37.156 |
| 19 | 6.844 | 7.633 | 8.907 | 10.117 | 11.651 | 27.204 | 30.144 | 32.852 | 36.191 | 38.582 |
| 20 | 7.434 | 8.260 | 9.591 | 10.851 | 12.443 | 28.412 | 31.410 | 34.170 | 37.566 | 39.997 |

FIG. 7B

DETECTION METHOD OF NETWORK ANOMALY AND ANOMALY DETECTION APPARATUS

CROSS-REFERENCE TO RELATED APPLICATION

This application claims the priority benefit of Taiwan application serial no. 112135433, filed on Sep. 18, 2023. The entirety of the above-mentioned patent application is hereby incorporated by reference herein and made a part of this specification.

BACKGROUND

Technical Field

This disclosure relates to a network analysis technology, and in particular to a detection method of network anomaly and an anomaly detection apparatus.

Description of Related Art

Artificial Intelligence (AI) services have been widely applied in factory automation environments and realized through network services. Therefore, network security will be an important issue for smart factories. In order for the factory production line to operate normally, the network needs to meet more stringent security requirements to avoid network attacks from various parties, which may affect the operation of the factory.

FIG. 1 shows an example of network intrusion detection. Referring to FIG. 1, for the application of network intrusion detection, network administrators can set the Network Intrusion Detection System (NIDS) at the entrance between the Intranet and the Internet to monitor the network packets flowing into the Intranet, so as to help network administrators to discover the anomalous conditions of the network, and then take preventive measures. However, such an approach can only provide a defense from the Internet to the Intranet, but it is difficult to focus on the whole network. For example, FIG. 2 shows an example of a malware intrusion. Referring to FIG. 2, when the Intranet is implanted with malware and the malware directly attacks the Intranet service, it is not only difficult to prevent, but also causes factory intelligence services (e.g., defect detection) to be interrupted, which in turn affects the production line operation.

SUMMARY

The disclosure provides a detection method of network anomaly and an anomaly detection apparatus, capable of providing a traffic detection function to detect anomalous traffic from a network.

The detection method of network anomaly in the embodiment of the disclosure is adapted to be executed by a processor. The detection method includes (but is not limited to) the following. One or more request intervals within a detection period are determined, where each of the request intervals is a time interval of two network requests from a network source. A network request anomaly from the network source is determined according to the request interval within the detection period.

The anomaly detection apparatus of the embodiment of the disclosure includes (but is not limited to) a communication transceiver, a storage, and a processor. The storage stores a program code. The processor is coupled to the communication transceiver and the storage. The processor loads the program code to execute: determining one or more request intervals within a detection period, where each of the request intervals is a time interval of two network requests from a network source received from the communication transceiver; and determining the network request anomaly from the network source according to the request interval within the detection period.

Based on the above, the detection method of network anomaly and the anomaly detection apparatus of the embodiment of the disclosure may determine network anomalies according to the time interval of two network requests. In this way, network security may be improved and network service reliability may be enhanced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

FIG. 7B is a schematic diagram of chi-square probabilities according to an embodiment of the disclosure.

DESCRIPTION OF THE EMBODIMENTS

Figure 1:
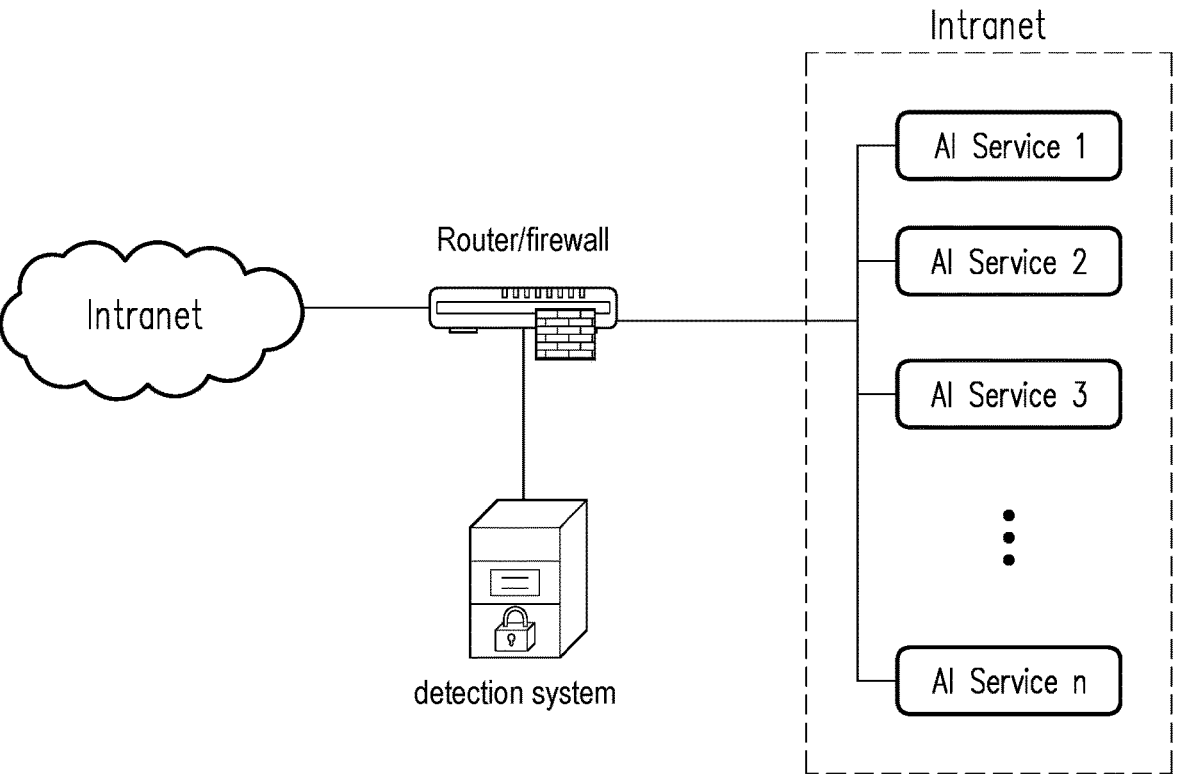
FIG. 1 shows an example of network intrusion detection.
Figure 2:
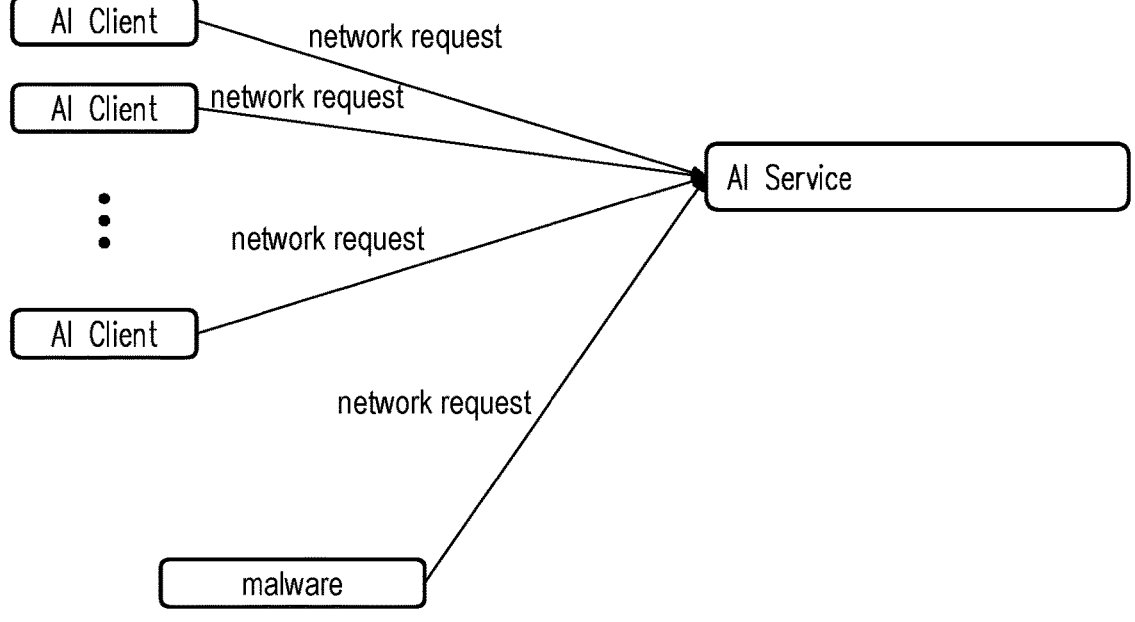
FIG. 2 shows an example of a malware intrusion.
Figure 3:
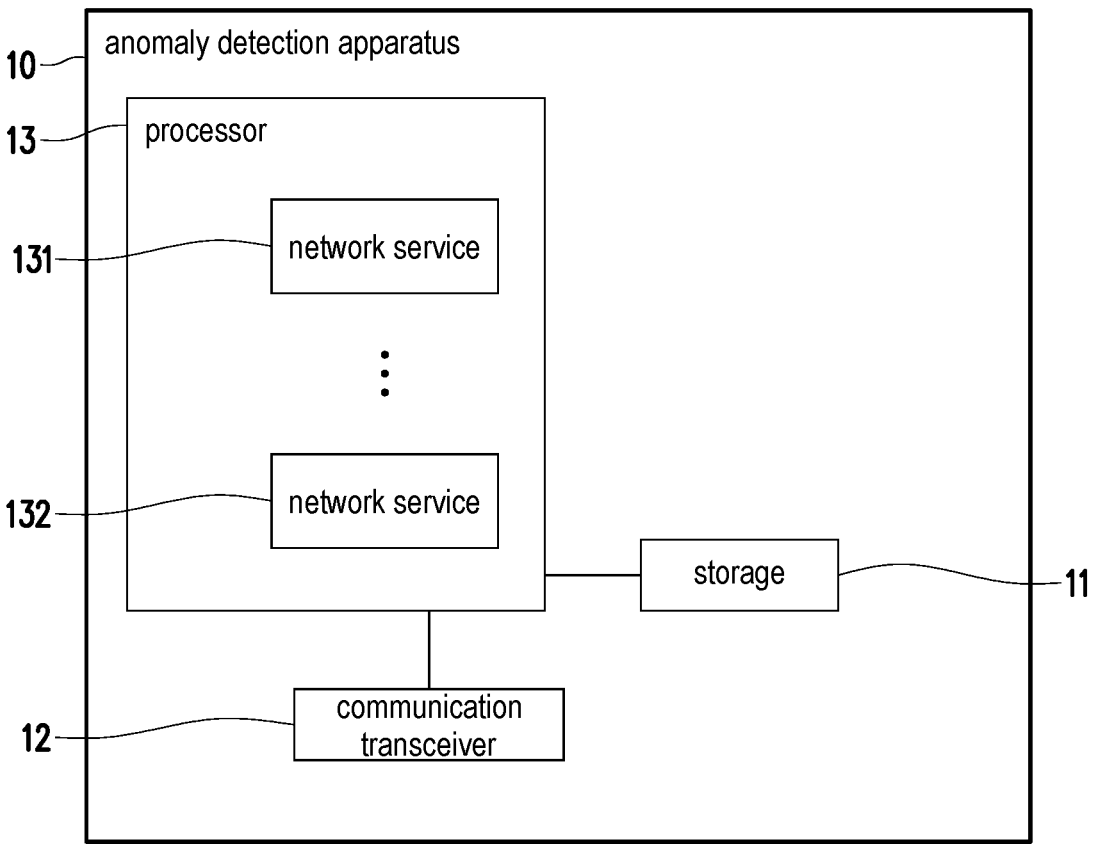
FIG. 3 is a component block diagram of an anomaly detection apparatus according to an embodiment of the disclosure.

FIG. 3 is a component block diagram of an anomaly detection apparatus 10 according to an embodiment of the disclosure. Referring to FIG. 3, the anomaly detection apparatus 10 includes (but is not limited to) a storage 11, a communication transceiver 12, and a processor 13. The anomaly detection apparatus 10 may be a router, firewall device, relay device, gateway device, computer host, server, smart phone, tablet computer, wearable device, smart home appliance, vehicle-mounted device, or other electronic device.

The storage 11 may be any type of fixed or removable random access memory (RAM), read only memory (ROM), flash memory, hard disk drive (HDD), solid-state drive (SSD), or similar components. In an embodiment, the storage 11 is configured to store program codes, software modules, configurations, data (e.g., periods, times, or model parameters) or files, and the embodiments thereof will be described in detail in the following.

The communication transceiver 12 may be a communication transceiver, serial communication interface (e.g., RS-232), or Universal Serial Bus (USB), Thunderbolt, or other communication transmission interface that supports, for example, fourth generation (4G) or other generations of mobile communications, Wi-Fi, Bluetooth, infrared, radio frequency identification (RFID), Ethernet, fiber-optic networks, and the like. In an embodiment, the communication transceiver 12 is configured to transmit or receive data with other electronic devices (e.g., remote devices from the Internet or networked devices in an intranet).

The processor 13 is coupled to the storage 11 and the communication transceiver 12. The processor 13 may be a central processing unit (CPU), a graphic processing unit (GPU), or other programmable general-purpose or special-purpose microprocessor, digital signal processor (DSP), programmable controller, field programmable gate array (FPGA), application-specific integrated circuit (ASIC), neural network accelerator, or other similar elements or combinations of the above elements. In an embodiment, the processor 13 is configured to execute all or part of operations of the anomaly detection apparatus 10, and may load and execute each program code, software module, file, and data stored in the storage 11. In some embodiments, functions of the processor 13 may be implemented through software or a chip.

In an embodiment, the processor 13 executes one or more network services 131, and provides the network service 131 through the communication transceiver 12. The network service 131 may be artificial intelligence detection, recognition or inference, web pages, cloud processing, data storage, or multimedia streaming, but is not limited thereto.

In the following, a method described in the embodiments of the disclosure is described in relation to various devices, components, and modules of the anomaly detection apparatus 10. Various processes of the method may be adapted according to the implementation situation.

Figure 4:
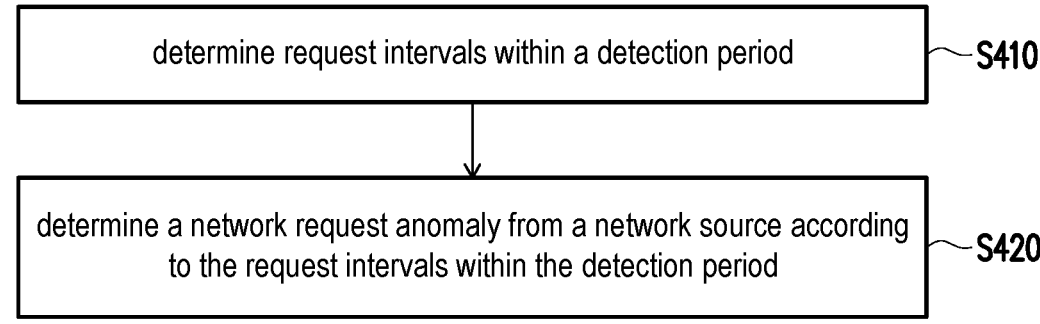
FIG. 4 is a flow chart of a detection method of network anomaly according to an embodiment of the disclosure.

FIG. 4 is a flow chart of a detection method of network anomaly according to an embodiment of the disclosure. Referring to FIG. 4, the processor 13 determines one or more request intervals within a detection period (step S410). Specifically, the detection period may be 10 seconds, 30 seconds, or one minute, and is not limited thereto. Each of the request intervals is a time interval of two network requests from a certain network source. In an embodiment, the network request is used to request the network service 131 provided by the anomaly detection apparatus 10 or other apparatuses. The processor 13 may capture network packets through software or program libraries such as Wireshark, tcpdump, SmartSniff, libpcap, winpcap or similar, and further analyze the received network packets. The network packet may include a network request for the network service 131, e.g., Hypertext Transfer Protocol (HTTP) request or Domain Name System (DNS) request. In an embodiment, the network request includes a source network address corresponding to the network source. The network source may be a remote device or any networked device. Different network sources may be distinguished by their source network addresses. In an embodiment, the network request includes a destination network address corresponding to the anomaly detection apparatus 10 or its network service 131. A network address may be an IP address, MAC address, or other identifying information.

The request interval is the time interval of any two consecutive network requests from a certain network source. In an embodiment, the processor 13 may record a timestamp of each of the network requests, and use a difference value between the timestamps of the two consecutive network requests received before and after as the request interval.

Figures 5, 6:
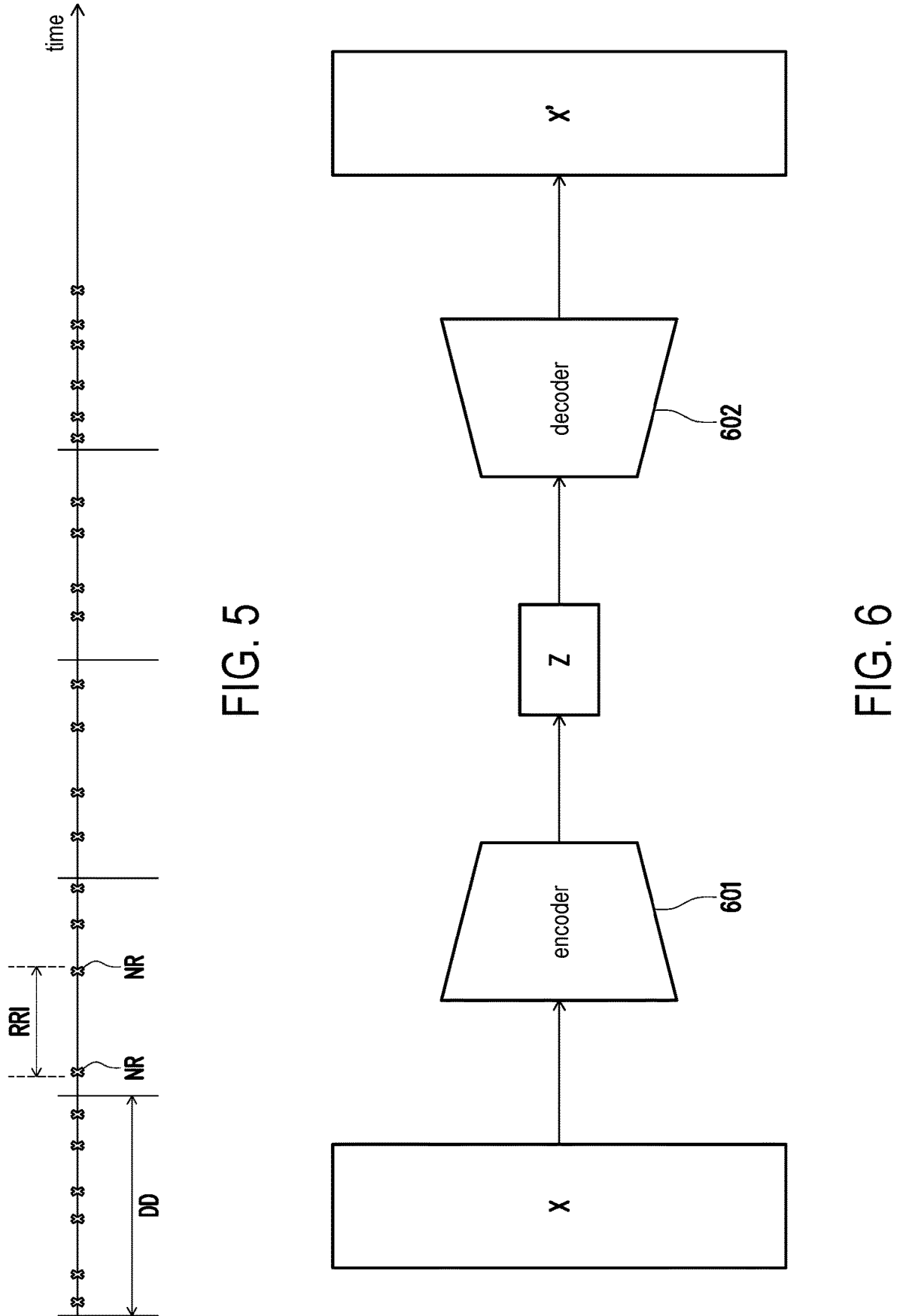
FIG. 5 is a schematic diagram of a request interval according to an embodiment of the disclosure.
FIG. 6 is a schematic diagram illustrating an autoencoder according to an embodiment of the disclosure.

For example, FIG. 5 is a schematic diagram of a request interval RRI according to an embodiment of the disclosure. Referring to FIG. 5, on a timeline, a network request NR for the network service 131 transmitted by a certain network source may be detected and received at intervals of one detection period DD. Under normal circumstances, the request interval RRI of two adjacent and consecutive network requests NR transmitted by the certain network source should be within a reasonable range. For example, if a production line corresponds to a source network address and its required speed is to process a network request NR within one second, then a reasonable value of the request interval RRI should be about 1 second (with a tolerance range depending on the requirements). However, in the event of a sudden burst of network requests NR or a network attack, the certain network source will send multiple consecutive network requests NR in rapid succession. At this point, the request interval RRI of the source network address of this network source will deviate from the reasonable range, or even approach 0. Therefore, it is reasonable to suspect that the network request NR sent from this network source may cause traffic anomalies in the network service 131, which may affect the overall service, or may even be suspected of being subject to a denial-of-service attack. Therefore, it can be seen that a time region of the two consecutive network requests NR may be used to evaluate traffic anomalies.

In an embodiment, if there are multiple network sources, the processor 13 determines the request interval of each of the network sources respectively.

Referring to FIG. 4, the processor 13 determines a network request anomaly from the network source according to one or more request intervals within the detection period (step S420). Specifically, a length of the request interval may be used to evaluate traffic anomalies and serve as a basis for evaluating network request abnormalities. In an embodiment, normal traffic may be defined by the speed/frequency at which the network requests are transmitted by the network source, e.g., the speed at which an AI client device on each assembly line of a factory production line sends each picture to the network service 131. One network request (e.g., for one picture) per second may be considered normal traffic.

In a factory production line, for example, a production line completes a picture every second and sends it to an AI client device for automated optical inspection (AOI) judgment. Next, the AI client device sends a network request to the network service 131 at a frequency of about one picture per second. The request interval is about 1 second. Based on this sending frequency, if the frequency of the network request from the AI client device is found to be different from a normal speed (i.e., normal traffic), for example, if the request interval becomes 0.001 seconds, it can be inferred that the AI client device may be in an anomalous condition.

In an embodiment, the processor 13 may determine one or more request intervals are anomalous intervals through a detection model. The detection model may be trained using one or more request intervals of one or more normal intervals. The normal interval is the request interval under normal traffic. In other words, training samples of the detection model have been marked as normal intervals belonging to normal traffic. The number of the training samples may be 60, 120 or 300, and is not limited thereto.

The detection model may be a model trained through a machine learning algorithm using known normal intervals. The machine learning algorithm may be autoencoder, decision tree, KNN (K Nearest Neighbor), Support Vector Machine (SVM), random forest, or neural network (NN), but not limited thereto. The detection model is configured to determine whether the request interval within the detection period is an anomalous interval or a request interval corresponding to anomalous traffic.

For example, FIG. 6 is a schematic diagram illustrating an autoencoder according to an embodiment of the disclosure. Referring to FIG. 6, autoencoder-based detection models include an encoder 601 and a decoder 602. The detection model is a model trained using multiple request intervals under normal traffic. Input data X is a request interval of a sequence. The encoder 601 encodes the input data X into compressed data Z. The compressed data Z is the input data X which is compressed by the encoder 601 of the detection model into a lower dimensional data. Next, the decoder 602 may decompress the compressed data Z into reconstructed data X'.

Assuming that the encoder 601 may be represented by a function $g_\varphi$, and the decoder 602 may be represented by a function $f_\theta$, a goal of the autoencoder is to find the functions $g_\varphi$ and $f_\theta$ by inputting the normal interval, such that $X'=f_\theta(g_\varphi(X))$, and X' is approximately or equal to X. That is, when the input data X is the normal interval, the reconstructed data X' is approximately or equal to the input data X. Then, the trained detection model may be used to make an inference about the request interval determined in step S410. In response to $|X-X'|<T_D$, the input data X is a normal interval or a request interval corresponding to normal traffic. In response to $|X-X'|>T_D$, the input data X is an anomalous interval or a request interval corresponding to anomalous traffic. A value of a threshold TD may be found from a specific quantile (e.g., 98, 97.5 or 95) of sample distribution for all $|X-X'|$.

In an application scenario, the detection model may be deployed to the network service 131. The network service 131 may detect anomalous traffic from one or more network sources on its own.

In addition, taking the production line for AOI defect detection as an example, the AI server (which may be implemented through the anomaly detection apparatus 10) provides a network service 131 for AOI detection. The network service 131 may execute an AI model (or AI service). When performing AOI inspection, each production line will have an AI client device to send pictures to be inspected to the AI model of the AI service for defect determination. If each AI client device in a production line sends a picture (corresponding to a network request) to the AI service at a frequency of 0.5 seconds, there may be a difference of approximately 0.5 seconds between two consecutive network requests sent by each AI client device in a production line. That is, the request interval is about 0.5 seconds. Under normal traffic conditions, request interval fragments are collected for each AI client device on each production line and their start times are recorded. For example, multiple segments of 60 request intervals are collected. Under normal traffic conditions, each group of the 60 request intervals will be characterized by normal traffic. If a detection model is trained with segments of the 60 request intervals, then the detection model will be a model with known normal traffic. Assuming that there is input data of the detection model of a group of 60 request intervals whose start time and a certain network source are known, if the input data and output data of the detection model are similar or equal (e.g., based on the comparison of the threshold value TD to determine whether they are similar or equal), it can be determined that this request interval is generated under normal traffic. On the contrary, if the difference between the input data and the output data of the detection model is too large (e.g., based on the comparison of the threshold value TD to determine whether the difference if too large), it can be determined that the request interval of the segment is generated under anomalous traffic and the production line may be in an anomalous condition or subject to a blocking attack. As a result, if the AI service is loaded into the detection model and traffic judgment is performed on the request interval of continuous network requests from each network source, it is possible to determine whether anomalies are occurring in the traffic of the network sources, and even to detect the network source with anomalous traffic in time and block/stop or not to process/drop the network requests from the network source. In this way, the network service 131 may be prevented from being affected.

For example, if time series of a network request from a network source is as follows (4.5, 5.0, 5.4, 6.0, 6.5 . . . , 16.7, 16.8, 16.82, 16.83, 16.89), a corresponding request interval is (0.5, 0.4, 0.6, 0.5, . . . , 0.1, 0.02, 0.01, 0.06), and if four request intervals are grouped together, the input data is X0=(0.5, 0.4, 0.6, 0.5), . . . , Xn=(0.1, 0.02, 0.01, 0.6), with n being a positive integer. The detection model may output X0'=(0.49, 0.41, 0.62, 0.5), . . . , Xn'=(0.5, 0.4, 0.3, 0.4) based on the input data.

$|Xt-Xt'|$ can be found in terms of Euclidean distances (t is one of 0 to n): e.g., $|X0-X0'|=\text{Sqrt}(0.0001+0.0001+0.0004+0)=0.0245$; $|Xn-Xn'|=\text{Sqrt}(0.16+0.1444+0.0841+0.1156)=0.71$.

If the threshold value TD is 0.2, it can be seen that the input data X0 belongs to the normal interval, while Xn belongs to the anomalous interval.

Under normal traffic conditions, it is inevitable that anomalous traffic segments will occur several times an hour or a day. However, in reality, the production line is in normal operation, and it is just that the AI client device may have a network problem at the time, and some network requests may be sent in a concentrated period of time, resulting in a short period of anomalous traffic. If the network service 131 of a certain network source is forcibly blocked because of this, it will be a misjudgment of the situation and may cause problems for a certain production line. Thus, anomalous traffic needs to be evaluated over a longer period than the detection period.

In an embodiment, the processor 13 may determine a number of occurrences one or more request intervals are anomalous intervals within the detection period. For example, for each detection period, the processor 13 counts the number of anomalous intervals determined by the detection model. The processor 13 may determine a network request anomaly from the network source according to the number of occurrences of the anomalous interval within multiple detection periods within a statistical period. The statistical period is greater than the detection period, and the statistical period includes multiple detection periods. For example, if the detection period is 30 seconds, the statistical period is 5 minutes, 10 minutes, or 60 minutes. Anomalous traffic conditions may occur continuously and irregularly within the statistical period, rather than only occurring in part of the time. Thus, in order to solve this problem, segments in which all anomalous traffic occurs for each network source is determined within the statistical period longer than the detection period (e.g., 60 request intervals). The segments in which the anomalous traffic occur may be called anomalous events. The segments where anomalous events occur may be called anomalous intervals. Next, whether the number of occurrences of anomalous events in the anomalous interval within the statistical period is within a reasonable range is observed. If the number of occurrences does not meet the normal conditions, it is determined that anomalous traffic has occurred. On the contrary, if the number of occurrences is consistent with normal conditions, it is determined that no anomalous traffic occurs. That is, the network source is under normal traffic.

In an embodiment, the processor 13 may determine whether the number of occurrences of the anomalous interval within the detection periods within the statistical period conforms to a statistical distribution to produce a compliance result. The compliance result includes that the number of occurrences within the statistical period conforms to the statistical distribution, and that the number of occurrences within the statistical period does not conform to the statistical distribution. It has been experimentally proven that under normal traffic, the number of anomalous events (i.e., segments/sets of number of occurrences of a specific number of anomalous intervals (e.g., 50, 60, or 100)) of each network source will comply with a statistical distribution/allocation per unit of time. For example, the statistical distribution is Poisson distribution, and its probability distribution function is:

$$P(X = x) = \frac{\eta^x e^{-\eta}}{x!},$$ (1)

where $\eta$ represents an average number of occurrences of anomalous events in the network source within the statistical period, and x is the number of occurrences of anomalous events in the network source within the detection period.

The processor 13 may determine the network request anomaly from the network source according to the compliance result of the statistical distribution. For example, if the average number of occurrences $\eta$ is estimated using anomalous events in a network source with normal traffic under normal conditions, then the number of occurrences of anomalous events within the statistical period will follow the Poisson $(\eta)$ distribution. On the contrary, if a number of occurrences of an anomalous period within the statistical period does not comply with the Poisson $(\eta)$ distribution, it is determined that the network request of the network source is anomalous, or the traffic is anomalous.

In an embodiment, the processor 13 may determine a test statistic according to a number of observation and a number of expectation. The number of observation is a number of occurrences in each of the detection periods, and the number of expectation is an expected value of the number of occurrences in the each of the detection periods in the statistical distribution. The average number of occurrences of anomalous events within multiple detection periods within the statistical period may be taken as the average number of occurrences $\eta$. The processor 13 calculates the probability of number of occurrences under the statistical distribution within the statistical period. For example, the processor 13 calculates the Poisson probability of each number of occurrences, $P(Xi)=pi$, where i is an integer. The processor 13 may calculate an expected number under each number of occurrences under the statistical distribution $Ei=n*pi$, where n is a total number of samples (i.e., a value of such occurrences). If $Ei<T_E$ (e.g., 5, 7, or 8), then the processor 13 may combine the number of occurrences for this detection period with the number of occurrences for the other detection periods.

In an embodiment, the test statistic is defined by a chi-square test. For example, the mathematical expression of the test statistic is:

$$\chi^2 = \sum_{i=1}^{k} \frac{(O_i - E_i)^2}{E_i},$$ (2)

where degree of freedom thereof is k−m−1. Since only one average number of occurrences $\eta$ is estimated, m=1, but it is not limited thereto. k is a number of cases of the number of occurrences. For example, if the number of occurrences is 0, 1, 3, then k is 3. A number of observations $O_i$ is an observation value, that is, an actual number of occurrences of anomalous events within the detection period.

Figure 7A:
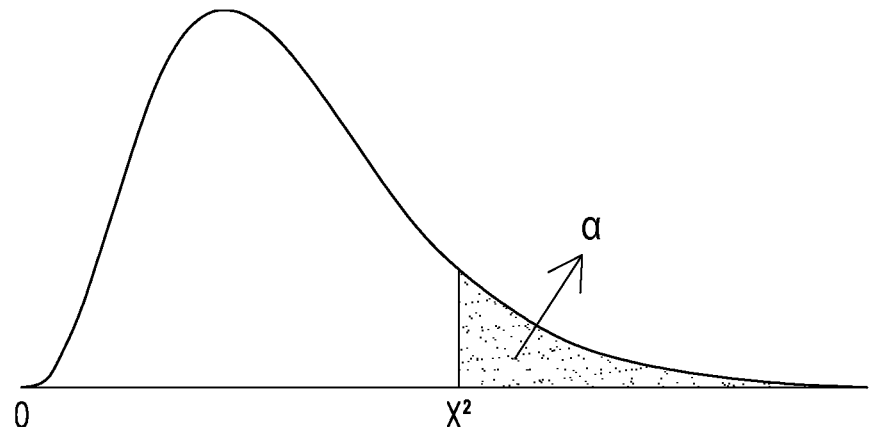
FIG. 7A is a schematic diagram illustrating an anomalous range according to an embodiment of the disclosure.

The processor 13 may determine the compliance result with the statistical distribution according to the test statistic. In an embodiment, the processor 13 may determine whether the test statistic lies within an anomalous range of the statistical distribution. For example, FIG. 7A is a schematic diagram illustrating an anomalous range $\alpha$ according to an embodiment of the disclosure. Referring to FIG. 7A, the curve is Poisson distribution. In response to the test statistic not lying within the anomalous range $\alpha$, the processor 13 may determine that the compliance result is that the number of occurrences of the anomalous interval within the statistical period conforms to the statistical distribution. That is, the traffic is considered normal, or the network request is normal. On the other hand, in response to the test statistic lying within the anomalous range $\alpha$, the processor 13 may determine that the compliance result is that the number of occurrences of the anomalous interval within the statistical period does not conform to the statistical distribution. That is, the traffic is considered anomalous, or the network request is anomalous.

In an embodiment, processor 13 may compare the test statistic with a threshold value. Taking FIG. 7A as an example, the threshold value is at a beginning of the anomalous range $\alpha$. The threshold value is $\chi_{k-m-1}^2$. FIG. 7B is a schematic diagram of chi-square probabilities according to an embodiment of the disclosure. Referring to FIG. 7B, taking the anomalous range $\alpha$ as 0.05 as an example, the threshold value is 3.841 (i.e., $\chi_{0.050}^2$ and df=k−m−1=1). And if the test statistic $\chi^2$ is greater than the threshold value $\chi_{k-m-1}^2$, it means that the test statistic is in the anomalous range $\alpha$, and it is regarded as the traffic anomalies occurred. On the contrary, it means that the test statistic is not within the anomalous range $\alpha$, and it is considered that the traffic anomalies have not occurred.

Figure 8:
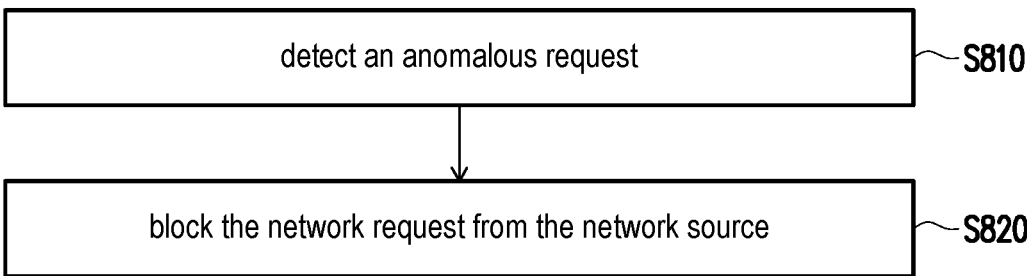
FIG. 8 is a flow chart for handling network anomaly according to an embodiment of the disclosure.

FIG. 8 is a flow chart for handling network anomaly according to an embodiment of the disclosure. Referring to FIG. 8, the processor 13 detects an anomalous request (i.e., a network request under anomalous traffic) (step S810), and the processor 13 may further block the network request from this network source (step S820). For example, packet filtering is performed on the network address of the network source to prohibit packets detected as anomalous requests from accessing the corresponding network service 131, or the network service 131 does not process or discards network requests for the network source.

Taking a factory as an example, for each AI client device in the production line, the detection model is first used to detect the time when an anomalous event occurs, and then Poisson distribution test is used to detect whether the traffic of the network request of the AI client device is anomalous.

Assuming that the statistical period is 30 minutes, and the detection period is set to 1 minute, during the statistical period, the number of occurrences of the anomalous events in each detection period is counted to see if it conforms to the normal Poisson distribution of a detection period of 1 minute.

Under normal circumstances, $\eta=0.1$ is observed within the statistical period, i.e., 0.1 anomalous events are observed on average every 1 minute, which is equivalent to one occurrence every 10 minutes. Since 30 minutes of observation is required, a total of 30 detection periods can be collected. The 30 pieces of data can be used for Poisson (0.1) testing to know whether the 30 pieces of data meet the Poisson (0.1) distribution or not. If the data matches the Poisson (0.1) distribution, then it is a normal traffic condition; if the data does not match the Poisson (0.1) distribution, then it is judged as an anomaly (i.e., the network request of the AI client device is anomalous).

The following are examples of anomalous situations:

If the occurrence time sequence of the anomalous events is (1:01, 1:31, 2:30, 3:02, 3:20, 10:30, 19:30, 20:42, 29:00), then it can be summarized as follows:

| number of occurrences | number of observations |
| --- | --- |
| 0 | 22 |
| 1 | 6 |
| 2 or more | 2 |

Next, it is necessary to check whether this table complies with Poisson ($\eta=0.1$) distribution with $\alpha=0.05$. The number of observation (O0, O1, O2)=(22, 6, 2) and the number of expectation (E0, E1, E2)=(30*P(X=0), 30*P(X=1), 30*P (X=2))=(27.145, 2.715, 0.135). If the test statistic $\chi^2=30.714$>threshold value $\chi_{k-m-1}^2=3.841$ (can be obtained by looking up the table with $\alpha=0.05$, k=3, and m=1), then the anomaly detection apparatus 10 determines that there is an anomalous network request traffic on this production line.

The following are examples of normal situations:

If the occurrence time sequence of anomalous events is (1:31, 2:30, 20:42), it can be summarized in the following table:

| number of occurrences | number of observations |
| --- | --- |
| 0 | 27 |
| 1 | 3 |
| 2 or more | 0 |

Next, it is necessary to check whether this table complies with Poisson ($\eta=0.1$) distribution with $\alpha=0.05$. The number of observation (O0, O1, O2)=(27, 3, 0) and the number of expectation (E0, E1, E2)=(30*P(X=0), 30*P(X=1), 30*P (X=2))=(27.145, 2.715, 0.135). If the test statistic $\chi^2=0.165$>threshold value $\chi_{k-m-1}^2=3.841$ (can be obtained by looking up the table with $\alpha=0.05$, k=3, and m=1), then the anomaly detection apparatus 10 determines that the network request of this production line is under normal traffic.

To sum up, in the detection method of network anomaly and the anomaly detection apparatus of the embodiment of the disclosure, the anomalous period of continuous network requests within the detection period is determined through the detection model, and whether the number of occurrences of anomalous events over a longer statistical period conforms to the statistical distribution is determined. In this way, anomalous traffic may be found efficiently so that anomalies can be handled as soon as possible.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A detection method of network anomaly, adapted to be executed by a processor, the detection method comprising:
   determining at least one request interval within a detection period, wherein each of the request intervals is a time interval of two network requests from a network source; and
   determining a network request anomaly from the network source according to the at least one request interval within the detection period, wherein determining the network request anomaly from the network source according to the at least one request interval within the detection period comprises:
   determining a number of occurrences of an anomalous interval where the at least one request interval is determined as the anomalous interval within the detection period; and
   determining the network request anomaly from the network source in response to the number of occurrences of the anomalous interval within a statistical period does not meet normal conditions, wherein the statistical period includes a plurality of the detection periods.

2. The detection method of network anomaly according to claim 1, wherein determining the network request anomaly from the network source according to the at least one request interval within the detection period comprises:
   determining that the at least one request interval is the anomalous interval through a detection model, wherein the detection model is trained using at least one request interval of at least one normal interval.

3. The detection method of network anomaly according to claim 1, wherein determining the network request anomaly from the network source according to the number of occurrences of the anomalous interval within the detection periods within the statistical period comprises:
   determining whether the number of occurrences of the anomalous interval within the detection periods within the statistical period conforms to a statistical distribution to produce a compliance result, wherein the compliance result comprises that the number of occurrences within the statistical period conforms to the statistical distribution, and that the number of occurrences within the statistical period does not conform to the statistical distribution; and
   determining the network request anomaly from the network source according to the compliance result of the statistical distribution.

4. The detection method of network anomaly according to claim 3, wherein determining whether the number of occurrences of the anomalous interval within the detection periods within the statistical period conforms to the statistical distribution comprises:
   determining a test statistic according to a number of observation and a number of expectation, wherein the number of observation is a number of occurrences in each of the detection periods, and the number of expectation is an expected value of the number of occurrences of the anomalous interval in the each of the detection periods in the statistical distribution; and determining the compliance result according to the test statistic.

5. The detection method of network anomaly according to claim 4, wherein determining the compliance result according to the test statistic comprises:

determining whether the test statistic lies within an anomalous range of the statistical distribution;

in response to the test statistic not lying within the anomalous range, determining that the compliance result is that the number of occurrences of the anomalous interval within the statistical period conforms to the statistical distribution; and in response to the test statistic lying within the anomalous range, determining that the compliance result is that the number of occurrences of the anomalous interval within the statistical period does not conform to the statistical distribution.

6. The detection method of network anomaly according to claim 5, wherein determining whether the test statistic lies within the anomalous range of the statistical distribution comprises:

comparing the test statistic with a threshold value, wherein the threshold value is at a beginning of the anomalous range.

7. The detection method of network anomaly according to claim 1, wherein determining the network request anomaly from the network source according to the at least one request interval within the detection period comprises:

blocking the network requests from the network source.

8. The detection method of network anomaly according to claim 4, wherein the test statistic is defined by a chi-square test.

9. The detection method of network anomaly according to claim 3, wherein the statistical distribution is Poisson distribution.

10. An anomaly detection apparatus, comprising:

a communication transceiver;

a storage, storing a program code; and a processor, coupled to the communication transceiver and the storage, loading the program code to execute:

determining at least one request interval within a detection period, wherein each of the request intervals is a time interval of two network requests from a network source received from the communication transceiver; and determining the network request anomaly from the network source according to the at least one request interval within the detection period, wherein the processor further executes:

determining a number of occurrences of an anomalous interval where the at least one request interval is determined as the anomalous interval within the detection period; and determining the network request anomaly from the network source in response to the number of occurrences of the anomalous interval within a statistical period does not meet normal conditions, wherein the statistical period includes a plurality of the detection periods.

11. The anomaly detection apparatus according to claim 10, wherein the processor further executes:

determining that the at least one request interval is the anomalous interval through a detection model, wherein the detection model is trained using at least one request interval of at least one normal interval.

12. The anomaly detection apparatus according to claim 10, wherein the processor further executes:

determining whether the number of occurrences of the anomalous interval within the detection periods within the statistical period conforms to a statistical distribution to produce a compliance result, wherein the compliance result comprises that the number of occurrences of the anomalous interval within the statistical period conforms to the statistical distribution, and that the number of occurrences of the anomalous interval within the statistical period does not conform to the statistical distribution; and determining the network request anomaly from the network source according to the compliance result of the statistical distribution.

13. The anomaly detection apparatus according to claim 12, wherein the processor further executes:

determining a test statistic according to a number of observation and a number of expectation, wherein the number of observation is a number of occurrences in each of the detection periods, and the number of expectation is an expected value of the number of occurrences in the each of the detection periods in the statistical distribution; and determining the compliance result according to the test statistic.

14. The anomaly detection apparatus according to claim 13, wherein the processor further executes:

determining whether the test statistic lies within an anomalous range of the statistical distribution;

in response to the test statistic not lying within the anomalous range, determining that the compliance result is that the number of occurrences of the anomalous interval within the statistical period conforms to the statistical distribution; and in response to the test statistic lying within the anomalous range, determining that the compliance result is that the number of occurrences of the anomalous interval within the statistical period does not conform to the statistical distribution.

15. The anomaly detection apparatus according to claim 14, wherein the processor further executes:

comparing the test statistic with a threshold value, wherein the threshold value is at a beginning of the anomalous range.

16. The anomaly detection apparatus according to claim 10, wherein the processor further executes:

blocking the network requests from the network source through the communication transceiver.

17. The anomaly detection apparatus according to claim 13, wherein the test statistic is defined by a chi-square test.

18. The anomaly detection apparatus according to claim 12, wherein the statistical distribution is Poisson distribution.

* * * * *